United States Patent [19]

Adams et al.

[11] 4,240,306
[45] Dec. 23, 1980

[54] RACK AND PINION ASSEMBLIES

[75] Inventors: Frederick J. Adams, Clevedon, England; Ralph M. Lehman, Chagrin Falls, Ohio

[73] Assignee: Cam Gears Limited, Hertfordshire, England

[21] Appl. No.: 868,114

[22] Filed: Jan. 9, 1978

[30] Foreign Application Priority Data

Jan. 10, 1977 [GB] United Kingdom .................. 722/77

[51] Int. Cl.³ ............................................. B62D 1/20
[52] U.S. Cl. .................................................... 74/498
[58] Field of Search .................... 74/497, 498, 500, 23

[56] References Cited

U.S. PATENT DOCUMENTS

| | | | |
|---|---|---|---|
| 3,090,641 | 5/1963 | Eminger | 74/23 |
| 3,379,906 | 4/1968 | Spohr | 74/23 |
| 3,546,957 | 12/1970 | Adams | 74/497 |
| 3,753,378 | 8/1973 | Bishop | 74/422 |
| 3,972,248 | 8/1976 | Adams | 74/498 |
| 3,983,763 | 10/1976 | Adams | 74/393 |
| 4,008,627 | 2/1977 | Bradshaw et al. | 74/498 |

FOREIGN PATENT DOCUMENTS 609356 10/1948 United Kingdom ...................... 74/498
1000594 8/1955 United Kingdom .

*Primary Examiner*—Samuel Scott
*Assistant Examiner*—Wesley S. Ratliff, Jr.

[57] ABSTRACT

A rack and pinion assembly includes a rack bar having a longitudinal axis along which it is displaceable in a rack bar housing. A pinion is rotatably mounted in the housing and has teeth which engage with helically formed teeth in a rack of the bar so that upon rotation of the pinion, the rack bar is displaced longitudinally relative to the housing. A control mechanism communicates between the rack bar and the housing and rotates the bar about its longitudinal axis and relative to the housing in response to the longitudinal displacement of the bar by the pinion.

3 Claims, 1 Drawing Figure

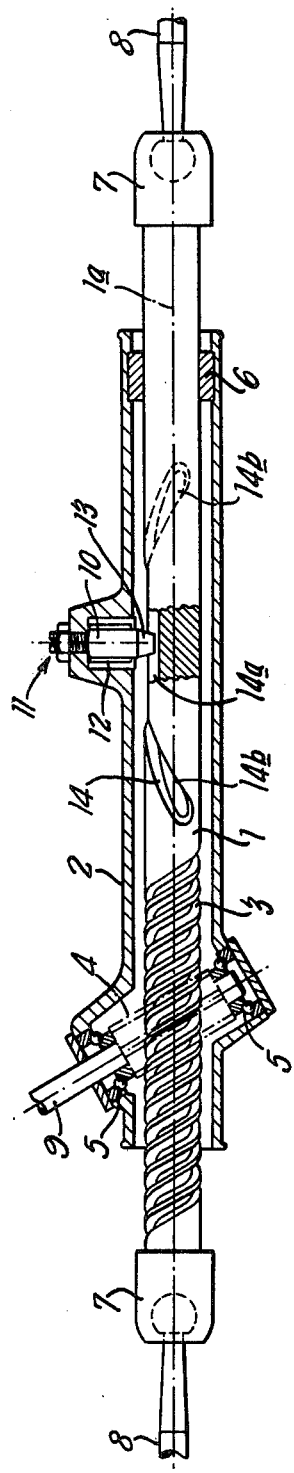

RACK AND PINION ASSEMBLIES

This invention relates to a rack and pinion assembly.

According to the present invention there is provided a rack and pinion assembly comprising a rack bar having a longitudinal axis along which it is displaceable in a rack bar housing, a pinion rotatably mounted in the housing and having teeth which engage with helically formed teeth in a rack of the rack bar so that upon rotation of the pinion, the rack bar is displaced longitudinally relative to the housing, and wherein control means is provided which communicates between the rack bar and the housing and by which means said rack bar is rotated about its longitudinal axis and relative to the housing in response to longitudinal displacement of the rack bar by the pinion.

In a rack and pinion assembly the mechanical advantage thereof may be determined from the ratio between the rotational input provided at the pinion and the longitudinal displacement of the rack bar which results from such rotation of the pinion. In conventional rack and pinion assemblies the mechanical advantage is usually regarded as constant throughout the permissible stroke of the rack bar; by the present invention however the provision of the control means causes the rack bar to rotate throughout, or during part of, its longitudinal displacement. During this latter rotation of the rack bar the helical teeth thereof are maintained in engagement with the pinion and so the rack bar will, in effect, exhibit screwed movement longitudinally across the pinion while the latter is rotated thereby changing the longitudinal displacement of the rack bar for a particular amount of rotation of the pinion and changing the gear ratio or mechanical advantage of the assembly accordingly.

It is envisaged that the rack and pinion assembly of the present invention will be particularly useful in a steering gear where the pinion is intended to be rotated in response to a steering input and the steering output is derived from the resultant longitudinal displacement of the rack bar. Alternatively the rack and pinion assembly of the present invention can be usefully applied, for example, in a machine tool whereby controlled movement can be effected for a component of the tool (such as a table) which is moveable with the rack bar in response to rotation of the pinion.

Although the control means may be arranged to impart rotational movement to the rack bar during displacement thereof for any position of the rack bar longitudinally relative to the housing, it is likely that there will usually be a central region of displacement of the rack bar relative to the housing over which the control means is ineffective to the extent that the rack bar is not rotated relative to the housing during its displacement through the aforementioned region. For example, with the rack and pinion assembly forming part of a steering gear as aforementioned and incorporated in a motor vehicle with the rack bar coupled to steerable road wheels in a conventional manner; for longitudinal displacement of the rack bar through a region which corresponds to the steerable wheels being straight or reasonably so, the control means may not impart rotational movement to the rack bar so that there is no change in the ratio of the gear; however, when the rack bar is displaced from the aforementioned central region so that the steerable wheels approach maximum lock the control means may become effective to the extent that the rack bar is rotated relative to the housing to vary the ratio to a predetermined extent. This latter effect may be particularly useful when parking in confined spaces where the steerable road wheels are rapidly moved from one lock to the other so that as the rack bar is displaced towards the end of its stroke for maximum lock the mechanical advantage afforded by the gear is increased.

The control means preferably comprises a co-operating longitudinal extending track and track follower one of which is located on the housing and the other on the rack bar so that as the track follower is displaced relatively along the track the rack bar is caused to be rotated as appropriate. In a preferred embodiment the track follower is in the form of a peg mounted on the housing so that an end thereof is slidable within a groove machined in the peripheral surface of the rack bar. Desirably the peg is carried in the housing to be rotatable about an axis which extends substantially radially relative to the longitudinal axis of the rack bar so that when the groove of the rack bar is displaced over the end of the peg the latter may rotate by its engagement with the wall of the groove to minimise the frictional characteristics which are developed between the peg and rack bar.

Although the helical teeth in the rack of the rack bar conveniently extend around the circumference of the rack bar it will be apparent that the circumferential extent of such teeth need only be such to ensure that they can maintain engagement with the pinion teeth throughout the intended rotational movement of the rack bar for its longitudinal displacement between extreme locks. Consequently the teeth on the rack bar may, on occasion, extend over 180° of the circumference of the rack bar. The pinion teeth which co-operate with the helical teeth of the rack will usually be straight or of helical form.

One embodiment of a rack and pinion assembly constructed in accordance with the present invention and incorporated in a steering gear will now be described by way of example only with reference to the accompanying illustrative drawing which shows a part longitudinal section through the gear.

The steering gear assembly comprises a cylindrical rack bar 1 having a longitudinal axis 1a and which is located in and extends through a pinion housing 2. The rack bar 1 is provided with a rack of helically formed teeth 3 which extend over 360° of its circumference. Co-operating with the helical teeth 3 are the teeth of a pinion 4 which is rotatably mounted in bearings 5 in the housing 2. The rack bar 1 is mounted in the housing 2 in a plane bearing or bush 6 through which it is longitudinally displaceable and within which it may be rotated about its longitudinal axis 1l and is also supported by a spring loaded yoke member (not shown) which engages the rack bar on the side thereof remote from its teeth 3 and directly opposite the pinion 4 to urge the teeth 3 into engagement with the pinion. The ends of the rack bar 1 are coupled through low friction universal joints 7 to tie rods 8 by which latter the output from the steering gear is intended to be transmitted to steerable road wheels when the gear is incorporated in a vehicle. In accordance with conventional rack and pinion steering gears the rack bar 1 is displaced longitudinally along its axis 1a and relative to the housing 2 upon rotation of the pinion 4 by an appropriate input to a shaft 9 of the pinion.

Mounted in the wall of the housing 2 and longitudinally spaced from the pinion 4 is a cylindrical peg 10 the axis of which extends substantially radially of the rack bar axis 1a. The peg 10 is retained on the wall of the housing 2 by a nut and bolt device 11 at its radially outer end which device permits the peg to rotate about its axis and relative to the housing 2 and in such rotational movement the peg 10 is supported by a roller bearing 12. The radially inner end 13 of the peg 10 is of frusto conical form and engages in a longitudinally entending groove 14 machined in the cylindrical surface of the rack bar 1. The groove 14 has a central region 14a over which it is substantially rectilinear and parallel with the axis 1a and end regions 14b over which the groove extends in a direction other than parallel with the axis 1a, for example in helical or other non-rectilinear formation. It will be noted that the right-hand end 14b of the groove is shown by broken lines to indicate that in the present example the groove extends to the rear side of the rack bar as drawn.

During longitudinal displacement of the rack bar 1 relative to the housing 2 it will be apparent that for so long as the end 13 of the peg is located in the region 14a of the groove there will be no rotation of the rack bar relative to the housing and consequently the ratio of the steering gear will be constant. However, upon the rack bar 1 being displaced along its axis 1a sufficiently for the peg 10 to move into and along either of the regions 14b of the groove, the reaction of the walls of the groove on the peg will cause the rack bar 1 to be rotated relative to the housing 2. As a consequence of this latter effect the helical teeth 3 will exhibit a screwed motion over the teeth of the pinion 4 whilst maintaining engagement therewith and during rotation of the pinion. Consequently a variation is provided in the displacement of the rack bar for a given rotation of the pinion 9 for when the peg 10 is being displaced relative to the groove regions 14b as compared with when the peg 10 is being displaced through the region 14a, this provides a corresponding change in the ratio and mechanical advantage which is provided by the gear.

The peg 10 is preferably rotatable in the bearing 12 as aforementioned to minimise the frictional characteristics developed between the groove 14 and the peg 10 while the latter is sliding over the walls of the groove. The teeth of the pinion 4 may be straight or may be helical in accordance with conventional practice.

What we claim is:

1. A variable ratio steering apparatus for use in effecting turning movement of a steerable vehicle wheel, said apparatus comprising a longitudinally extending rack gear movable along its longitudinal central axis to transmit an axially directed force, said rack gear being adapted to be connected with the steerable vehicle wheel to effect turning movement of the steerable wheel under the influence of the axially directed force, a pinion gear disposed in meshing engagement with said rack gear and adapted to be connected with a manually actuatable input member to effect movement of said rack gear along its longitudinally extending central axis in response to movement of the input member, and control means connected with said rack gear for effecting a variation in the rate of movement of said rack gear along its longitudinal central axis to thereby vary the rate of turning movement of the steerable vehicle wheel, said control means including a cam track disposed on and movable with said rack gear and a cam follower which cooperates with said cam track to effect rotational movement of said rack gear relative to said pinion gear and to hold said rack gear against rotational movement relative to said pinion gear, said cam track having a central region which extends parallel to the longitudinal central axis of said rack gear and a pair of end regions which extend from opposite ends of said central region in directions transverse to the central axis of said rack gear, said cam follower cooperating with said cam track to hold said rack gear against rotational movement during engagement of said cam follower with said central region of said cam track during one portion of the movement of said rack gear along its longitudinal central axis to thereby render said control means ineffective to vary the rate of turning movement of the steerable vehicle wheel during said one portion of the movement of said rack gear along its longitudinal central axis, said cam follower cooperating with said end regions of said cam track to effect rotational movement of said rack gear relative to said pinion gear during engagement of said cam follower with said end regions of said cam track during other portions of the movement of said rack gear along its central axis to thereby render said control means ineffective to vary the rate of turning movement of the steerable vehicle wheel during the other portions of movement of said rack gear along its longitudinal central axis.

2. A variable ratio steering apparatus as set forth in claim 1 wherein said end regions of said cam track are substantially helical in form.

3. A variable ratio steering apparatus as set forth in claim 1 wherein said rack gear includes a plurality of gear teeth formed in a rack bar, said cam track being formed as a groove in said rack bar and being spaced from said rack gear teeth.

* * * * *